(12) United States Patent
Nelson et al.

(10) Patent No.: US 9,790,895 B2
(45) Date of Patent: Oct. 17, 2017

(54) PROPULSION SYSTEM COMPRISING PLURALITY OF INDIVIDUALLY SELECTABLE SOLID FUEL MOTORS

(71) Applicant: Pacific Scientific Energetic Materials Company, Valencia, CA (US)

(72) Inventors: Steven Nelson, Huntington Beach, CA (US); Peter Current, Valencia, CA (US); Steven Stadler, Castaic, CA (US)

(73) Assignee: PACIFIC SCIENTIFIC ENERGETIC MATERIALS COMPANY, Valencia, CA (US)

( * ) Notice: Subject to any disclaimer, the term of this patent is extended or adjusted under 35 U.S.C. 154(b) by 0 days.

(21) Appl. No.: 14/844,597

(22) Filed: Sep. 3, 2015

(65) Prior Publication Data

US 2016/0061148 A1 Mar. 3, 2016

Related U.S. Application Data

(60) Provisional application No. 62/045,493, filed on Sep. 3, 2014.

(51) Int. Cl.
*F02K 9/95* (2006.01)
*B64G 1/40* (2006.01)
(Continued)

(52) U.S. Cl.
CPC .............. *F02K 9/95* (2013.01); *B64G 1/26* (2013.01); *B64G 1/403* (2013.01); *F02K 9/10* (2013.01); *F02K 9/24* (2013.01); *F02K 9/763* (2013.01)

(58) Field of Classification Search
CPC .. B64G 1/26; B64G 1/40; B64G 1/403; F42B 10/661; F02K 9/08; F02K 9/10;
(Continued)

(56) References Cited

U.S. PATENT DOCUMENTS 6,178,741 B1    1/2001  Nelson et al.
6,263,665 B1 *  7/2001  Ketsdever ............... F02K 9/94
                                              60/203.1
(Continued)

FOREIGN PATENT DOCUMENTS

ES           2342520 A1 *  7/2010  ............. B64G 1/403

OTHER PUBLICATIONS

International Preliminary Report on Patentability, International Application No. PCT/US2015/048332 dated Mar. 16, 2017, 10 pages.

*Primary Examiner* — Joseph W Sanderson
(74) *Attorney, Agent, or Firm* — Moreno IP Law LLC

(57) ABSTRACT

A propulsion system for use with a satellite comprises a substrate, a communication network and a cluster of individually selectable solid fuel motors mounted on the substrate and operatively connected to the communication network. A controller is also operatively connected to the communication network and operative to select any one of more motors of the cluster of individually selectable solid fuel motors and transmit signals to fire the one or more motors of the individually selectable solid fuel motors. The substrate may have various configurations. The cluster of motors may comprise 10-1000 motors, which may be arranged in a rectangular array or other formation. Subsets of motors having different impulse capabilities may be employed. In this manner, lighter, smaller, flexible and more efficient propulsions systems may be provided for use in attitude control, etc. of satellites.

14 Claims, 5 Drawing Sheets

(51) Int. Cl.
*B64G 1/26* (2006.01)
*F02K 9/10* (2006.01)
*F02K 9/24* (2006.01)
*F02K 9/76* (2006.01)

(58) Field of Classification Search
CPC ..... F02K 9/12; F02K 9/16; F02K 9/28; F02K 9/30; F02K 9/36; F02K 9/94; F02K 9/95
See application file for complete search history.

(56) References Cited

U.S. PATENT DOCUMENTS

| | | | | |
|---|---|---|---|---|
| 6,378,292 | B1 * | 4/2002 | Youngner | B64G 1/403 244/169 |
| 6,487,844 | B1 * | 12/2002 | Lohn | F02K 9/88 60/200.1 |
| 6,904,749 | B2 * | 6/2005 | Joshi | B64G 1/22 60/219 |
| 7,021,217 | B2 * | 4/2006 | Desai | B64G 1/26 102/202.5 |
| 7,254,936 | B1 * | 8/2007 | Knight | F02K 9/10 102/287 |
| 7,644,661 | B1 | 1/2010 | Nelson et al. | |
| 7,752,970 | B2 | 7/2010 | Nelson et al. | |
| 7,762,189 | B2 | 7/2010 | Ritchie et al. | |
| 7,800,031 | B2 * | 9/2010 | Rastegar | F42B 10/661 102/374 |
| 8,037,823 | B2 | 10/2011 | Ritchie et al. | |
| 8,119,958 | B2 * | 2/2012 | Adams | F41G 7/30 102/301 |
| 8,136,448 | B2 | 3/2012 | Nelson et al. | |
| 8,213,151 | B2 | 7/2012 | Nelson et al. | |
| 8,464,640 | B2 * | 6/2013 | Sawka | C06B 45/00 102/202 |
| 8,641,842 | B2 * | 2/2014 | Hafner | C06B 25/24 149/108.8 |
| 8,794,930 | B2 * | 8/2014 | Sanchez | F03H 99/00 417/207 |
| 8,826,640 | B2 * | 9/2014 | Olden | B64G 1/26 244/3.21 |
| 2003/0192997 | A1 * | 10/2003 | Desai | B64G 1/26 244/169 |
| 2005/0034447 | A1 * | 2/2005 | Joshi | B64G 1/22 60/253 |
| 2010/0175574 | A1 | 7/2010 | Nelson et al. | |
| 2010/0206195 | A1 * | 8/2010 | Rastegar | F42B 10/661 102/377 |
| 2012/0117941 | A1 * | 5/2012 | Olden | B64G 1/26 60/255 |
| 2013/0048163 | A1 * | 2/2013 | Hafner | C06B 25/24 149/6 |
| 2016/0075454 | A1 * | 3/2016 | Smith, Jr. | B64G 1/40 244/171.1 |

\* cited by examiner

PROPULSION SYSTEM COMPRISING PLURALITY OF INDIVIDUALLY SELECTABLE SOLID FUEL MOTORS

CROSS-REFERENCE TO RELATED APPLICATION

The instant application claims the benefit of Provisional U.S. Patent Application Ser. No. 62/045,493 entitled "Solid State Propulsion And Attitude Control System For Satellites" and filed Sep. 3, 2014, the teachings of which are incorporated herein by this reference.

FIELD

The instant disclosure relates generally to satellite propulsion and, more particularly, to a propulsion system comprising a plurality of individually selectable solid fuel motors.

BACKGROUND

Artificial satellites have long been in use for space or earth observation, reconnaissance, navigation, communications and scientific measurements. Satellites typically consist of a mission payload and a payload platform or bus. The mission payload performs one or more of the aforementioned functions and the payload platform provides electrical power, thermal management, payload pointing, terrestrial communications, and attitude and orbit control to support the mission payload. Electrical power is typically supplied using solar cells and batteries for power storage and supply when the satellite is in earth's shadow. Thermal management may include heaters when in the earth's shadow, and payload pointing and reflective materials to avoid solar heating. Communications takes place using an omnidirectional antenna between the satellite and ground stations for state of health telemetry, command and control. Finally, most satellites include an attitude determination and control system (ADCS) consisting of sensors and momentum wheels for keeping the satellite pointed in the correct direction and removing residual momentum. In addition to the ADCS, many satellites include an on-board propulsion system for maneuvering and positioning the satellite.

Existing choices for satellite propulsion include monopropellant and bipropellant liquid propellants, cold gas propellants and electric propulsion. Unfortunately, most satellite propulsion systems have significant disadvantages. For example, liquid propellants are frequently toxic, require complex plumbing, valving and pressurization systems and, when firing rocket motors, consume significant power. Cold gas systems, while less complex than liquid propellant systems also require plumbing and valving, have poor mass and delivered impulse efficiency and also require significant power when firing motors. Electric propulsion systems have very high impulse efficiency, but are heavy and typically require very high power levels to operate and produce very low thrust levels.

Thus, it would be advantageous to provide a propulsion system that overcomes many of the above-noted deficiencies.

SUMMARY

The instant disclosure describes a propulsion system for use with a satellite. More specifically, the system comprises a substrate, a communication network and a cluster of individually selectable solid fuel motors mounted on the substrate and operatively connected to the communication network. The system further comprises a controller that is also operatively connected to the communication network and operative to select any one of more motors of the cluster of individually selectable solid fuel motors and transmit signals to fire the one or more motors of the individually selectable solid fuel motors. The substrate thus employed may be planar and have a substantially circular or rectangular circumference, though the instant disclosure is not limited in this regard. In an embodiment, the substrate is configured such that it may be mounted within a one unit (1U) CubeSat module.

In another embodiment, the cluster of individually selectable solid fuel motors may number between 10 and 1000 motors. Furthermore, the cluster of individually selectable solid fuel motors may be arranged in an array, as in the case of regularly ordered columns and rows. Further still, the cluster of individually selectable solid fuel motors may be selected to have multiple subset of motors such that each motor within a given subset of motors has an impulse capability that is different than the motors encompassed by each of the other subsets of motors. Each of the motors may comprise a so-called green propellant.

In an embodiment, the controller may comprises a network controller that is operatively connected to a plurality of integrated circuits via the communication network. In this embodiment, each integrated circuit may correspond to at least one motor of the cluster of individually selectable solid fuel motors. Additionally, each integrated circuit has a unique identifier stored therein that facilitates the selection individual motors within the cluster of individually selectable solid fuel motors. Further still, each integrated circuit is configured to actuate at least one igniter associated with the at least one motor of the cluster of individually selectable solid fuel motors.

In yet another embodiment, a satellite may comprise a propulsion system in accordance with the instant disclosure. More specifically such a satellite may comprise a pair of propulsion systems in accordance with the instant disclosure, wherein the pair of propulsion systems is arranged so that the propulsion systems are complementary to each other about a center of gravity of the satellite.

BRIEF DESCRIPTION OF THE DRAWINGS

The features described in this disclosure are set forth with particularity in the appended claims. These features and attendant advantages will become apparent from consideration of the following detailed description, taken in conjunction with the accompanying drawings. One or more embodiments are now described, by way of example only, with reference to the accompanying drawings wherein like reference numerals represent like elements and in which:

DETAILED DESCRIPTION OF THE PRESENT EMBODIMENTS

Figure 1:
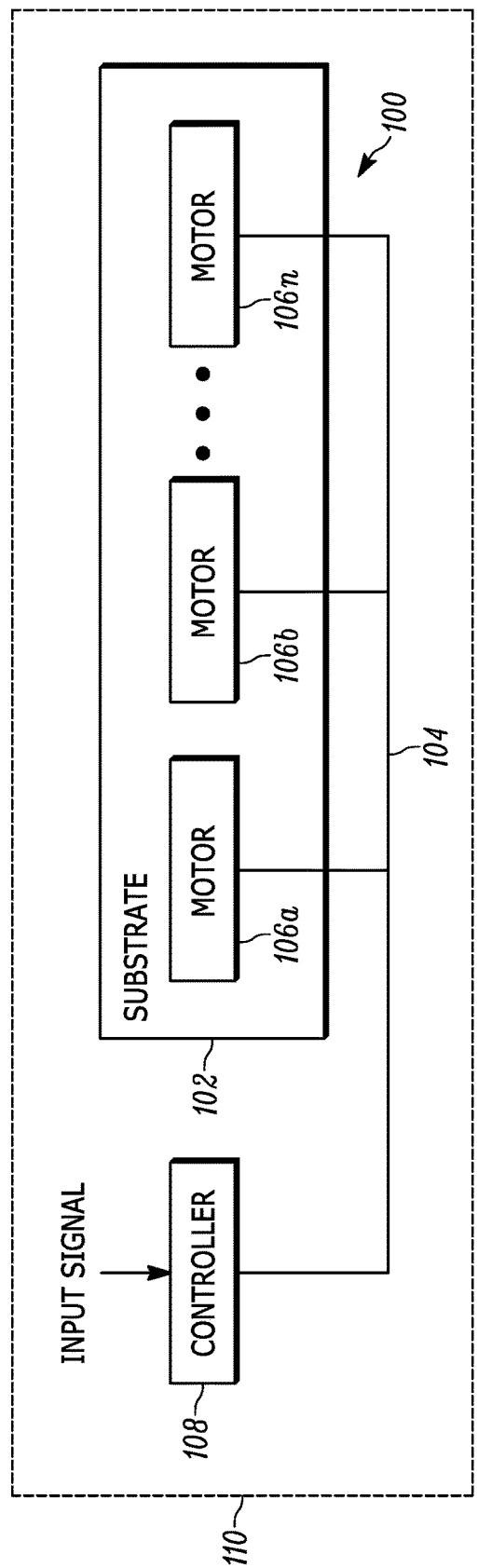
FIG. 1 is a schematic block diagram of a propulsion system in accordance with the instant disclosure.

Referring now to FIG. 1, a propulsion system 100 in accordance with the instant disclosure is illustrated. In particular, the propulsion system 100 comprises a substrate or housing 102 having a cluster of solid fuel motors 106 mounted on the substrate 102. As used herein, a cluster constitutes a group of same or similar items gathered or occurring closely together. Thus, as illustrated in further embodiments described below, the motors 106 are grouped together with relatively little space between them in order to minimize the overall size of the propulsion system 100. A controller 108 is operatively connected to each of the motors 106 via a communication network 104. A feature of the instant disclosure is that each of the motors 106 is individually selectable or addressable by the controller 108. As further shown, the propulsion system 100 may constitute a component of a satellite 110. The nature and construction of the satellite 110 is not limited to any particular types, though, as described in further detail below, the beneficial application of the propulsion system 100 to the satellite 110 may depend on the size of the satellite 110.

In an embodiment, the controller 108 and communication network 104 may be implemented using a Smart Energetics Architecture (SEA™) bus as provided by Pacific Scientific Energetic Materials Company of Hollister, Calif., and described, for example, in U.S. Pat. No. 7,644,661, the teachings of which prior patent are incorporated herein by this reference. As known in the art, the controller 108, as implemented in the SEA bus, can select any one of the individual motors 106 and transmit signals to the selected motor to, among other things, cause that motor to fire. For example, as shown in FIG. 1, the controller 108 could send a signal to only the first motor 106a of the n different motors. In an embodiment, the number of motors, n, mounted on the substrate 102 may typically number from 10 to 1000 individually addressable motors. In practice, the number of motors used will depend largely upon the nature of the particular application. As used herein, it is understood that the controller 108 may include components that are specific to, and collocated with, respective ones of the motors 106. For example, in the SEA bus implementation, the controller 108 may comprise a centralized, network controller (implemented as an application specific circuit (ASIC), microprocessor, microcontroller, programmable logic array (PLA), etc.) that communicate with integrated circuits deployed in connection with each of the motors 106. Because each of the integrated circuits includes a unique identifier stored therein, the network controller can effectively select any individual motor 106. Generally, the SEA bus is a flight-proven, very low volume and power, multiple-inhibit, space radiation tolerant, ASIC-based control and firing system. In practice, the SEA bus enables firing of hundreds of motors with microsecond repeatability and sub-millisecond sequencing. As indicated by the input signal provided to the controller 108, the SEA bus is capable of interfacing with a satellite control system via an RS-422 compliant serial bus or other parallel or serial interface options as known in the art.

Figure 2:
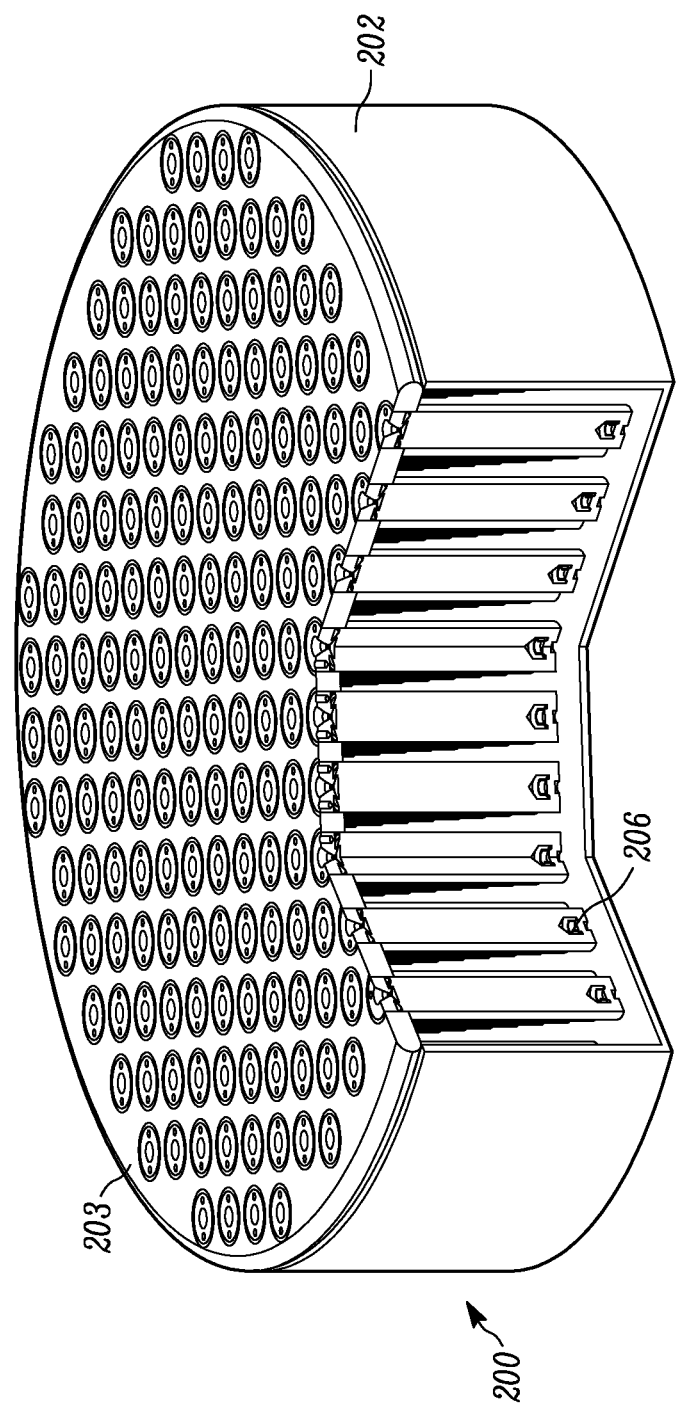
FIG. 2 illustrates a partial cross-sectional view of a one embodiment of a substrate and a cluster of solid fuel motors in accordance with the instant disclosure.

Referring now FIG. 2, there is illustrated an exemplary propulsion system 200 is illustrated. In particular, the system 200 comprises a substrate 202 having a substantially (i.e., within manufacturing tolerances) circular perimeter and planar upper surface 203, as shown. The substrate 202 may be manufactured out of any suitable material such as aluminum, steel, titanium, etc., or a non-outgassing space rated plastic/polymer as known in the art. Each motor 206 is mounted such that its nozzle (see FIG. 5) is substantially flush with the upper surface 203. Though the substrate 202 is illustrated having an essentially planar surface 203, this is not a requirement and the surface 203 may be curved as in the case of a cylindrical, hemispherical or other curved shaped. Further still, the upper surface 203 may comprise multiple planar surfaces. As further illustrated in FIG. 2, though not a requirement, the cluster of motors 206 is arranged in an array, i.e., according to regular columns and rows.

Figure 5:
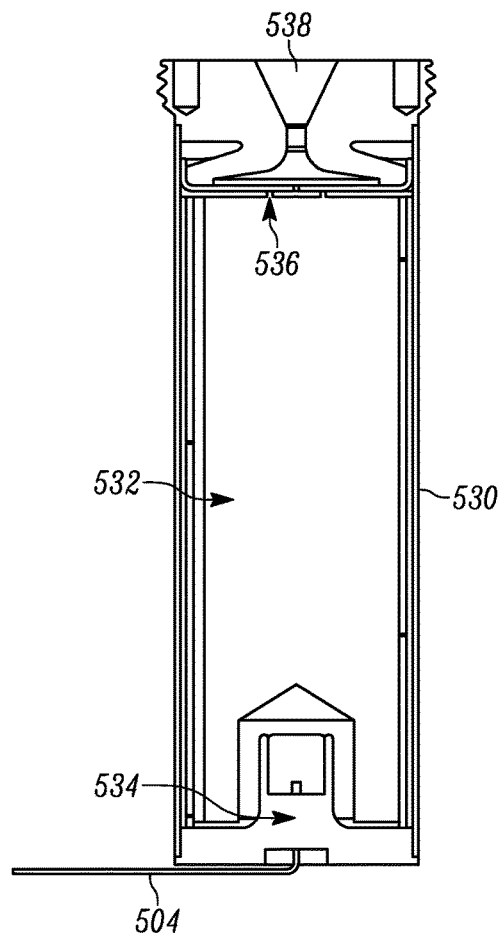
FIG. 5 is a cross-sectional view of a solid fuel motor in accordance with the instant disclosure.

FIG. 5 illustrates an example of a solid fuel motor 506 shown in cross section. As shown, the motor 506 comprises a tubular housing 530 encasing a solid propellant 532. The tubular housing 530 may be fabricated from any suitable metal such as aluminum, steel or titanium. Preferably, the solid propellant 532 is "green" in that it is free of (or at least minimizes) any metals and is smokeless, and may comprise a single or double base or a composite material. The propellant 532 is hermetically sealed within the housing 530 by an igniter 534 on one end and a burst disk 536 on the other end. The igniter 534 may comprise any suitable igniter as known in the art, including but limited to, including an exploding foil initiator (EFI), a semiconductor bridge (SCB), reactive semiconductor bridge (RSCB), thin film bridge (TFB) or a bridgewire initiator. As shown, the igniter 534 is coupled to a signal path 504 that carries an electrical signal (initiated, for example, in response to a control signal provided by the controller 108 of FIG. 1) capable of firing the ignitor 534. The burst disk 536 is preferably petaled so as to minimize any debris upon ignition. As further shown and known in the art, the motor 506 may also comprise a nozzle plate 538 to beneficially guide the combustion products provided by the propellant 532. In an embodiment, each motor 506 is dimensioned to carry 14 g of propellant 532, and has an overall mass of approximately 20 g. Thus configured, each motor 534 provides 27.4 N-s of impulse upon ignition.

Referring once again to FIG. 2, in the illustrated embodiment, the substrate 202 15 inches in diameter and 5 inches tall, though these dimensions may vary as a matter of design choice. As configured, and assuming motors 206 in accordance with the embodiment of FIG. 5, the substrate 202 and cluster of motors 206 fits within a separation system volume of a typical satellite and provides 5500 N-s total impulse or 55 m/s delta-V (i.e., the impulse available to perform a desired maneuver of a satellite) on a 100 kg spacecraft. Although the substrate 202 in FIG. 2 is shown mounted with approximately 80 motors, it is once again understood that the substrate 202 may include tens or hundreds of such individual motors. Additionally, while the motors 206 illustrated in FIG. 2 are all of the same size, and therefore possess the same impulse capability, it is understood that this is not a requirement. That is, the cluster of motors may include subsets of motors, where the motors of each subset are of the same size/impulse capability, yet different in size/impulse capability than the motors of each of the other subsets.

Figure 3:
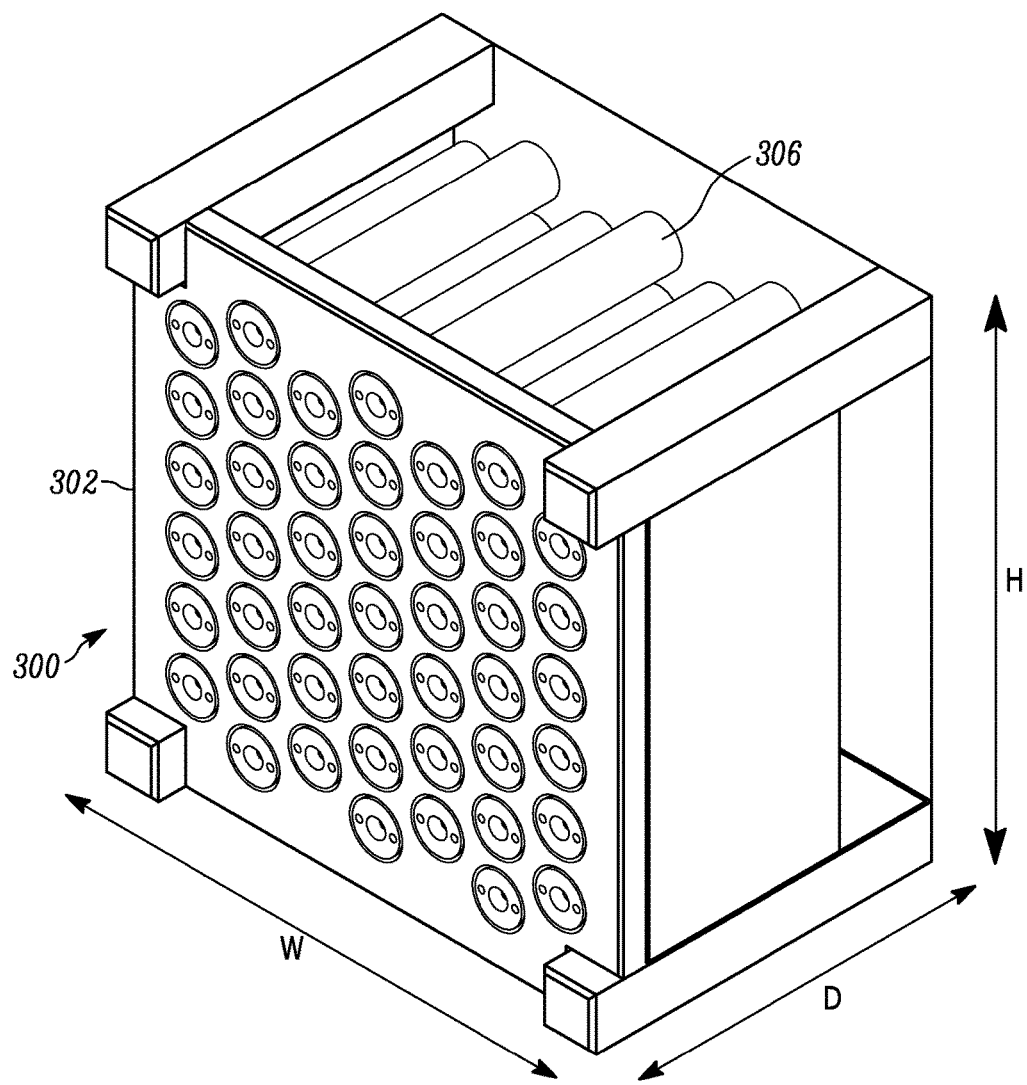
FIG. 3 illustrates perspective view of another embodiment of a substrate and a cluster of solid fuel motors in accordance with the instant disclosure.
Figure 4:
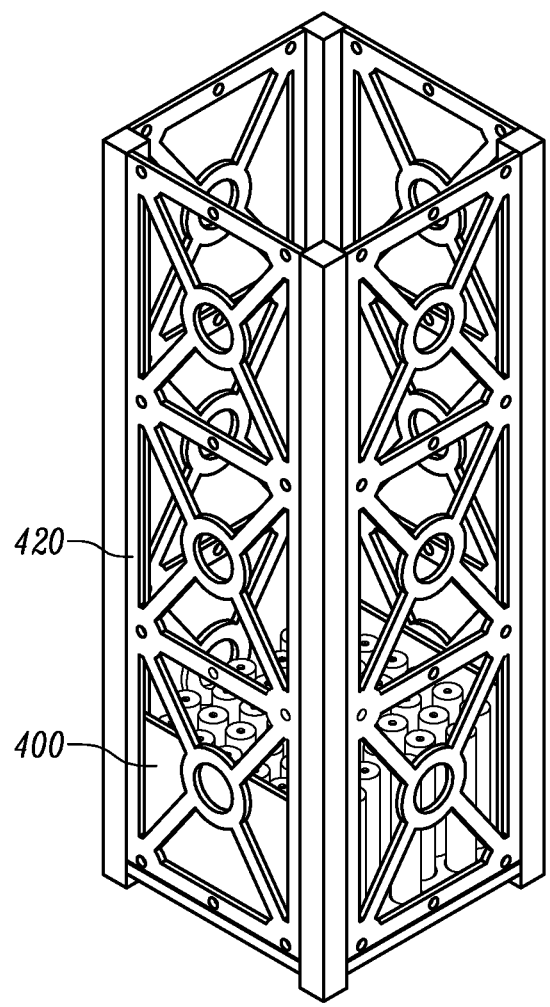
FIG. 4 illustrates a perspective view of the propulsion system of FIG. 3 mounted within a deployment pod.

Referring now to FIG. 3 illustrates an alternate embodiment of a propulsion system 300 in accordance with the instant disclosure. In this embodiment, the substrate 302 is once again planar and has a substantially rectangular outer perimeter. In keeping with the so-called CubeSat reference design standard. As known in the art, the CubeSat design standard requires modules that fit within a 10 cm×10 cm×10 cm cube, often referred to as "one unit" or "1U" module. Thus, in the embodiment illustrated in FIG. 3, the height (H) and width (W) dimensions of the substrate 302 are selected to be 10 cm each and the depth (D) dimension is selected to be 5 cm, thus forming what is typically referred to as "½U" configuration. Additionally, so-called ¼U or "tuna can" configurations are also possible. It noted that the motors 306 in FIG. 3, while clustered as in FIG. 2, are not arranged in the column and rows of a rectangular array, but are instead arranged in diagonal rows of differing lengths. As shown in FIG. 4, the propulsion system 300 of FIG. 3 may be mounted within a so-called 3U deployment pod 420. Assuming compliance with the CubeSat standard and use of the motors 504 described above relative to FIG. 5, the propulsion system 300 can provide approximately 40 m/s delta-V for a 3U CubeSat.

Figure 6:
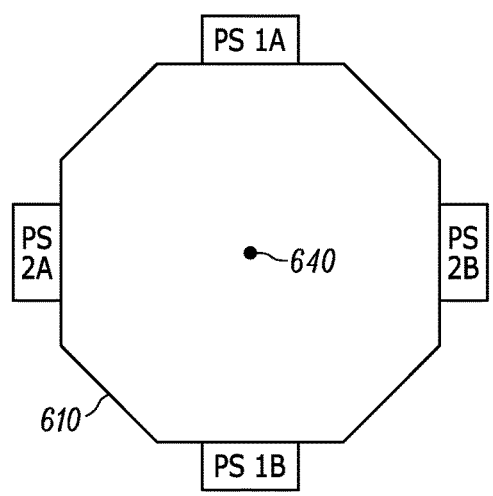
FIG. 6 is a schematic block diagram of a satellite incorporating a pair of propulsion systems in accordance with the instant disclosure.

Finally, with reference to FIG. 6, an exemplary satellite 610 may comprise pairwise deployments of propulsion systems in accordance with the instant disclosure. More particularly, each pair of propulsion systems may be mounted on the satellite 610 in complementary positions about a center of gravity 640 of the satellite 610. For example, a first pair of propulsion systems, PS 1A and PS 1B, may be configured to induce clockwise rotation of the satellite 610 about the center of gravity 640, whereas a second pair of propulsion systems, PS 2A and PS 2B, may be configured to induce counter-clockwise rotation of the satellite 610 about the center of gravity. Those of skill in the art will appreciate that other pairwise deployments of propulsion systems in other rotational planes may be additionally deployed on the satellite 610. Alternatively, the pairs of propulsion systems PS 1A, PS 1B, PS 2A, PS 2B may be configured such that opposing motors can be actuated to induce strictly linear translation of the satellite 610. Further still, a single "plate" of motors may also be mounted on an axis intersecting the center of gravity 640 with opposing motor pairs actuated for pure linear translation along the axis.

In this manner, propulsion systems in accordance with the instant disclosure may be used in addition to or as part of the ADCS (not shown), or linear propulsion system, of the satellite 610. That is, such propulsion systems, in addition to performing delta-V maneuvers for station keeping, can also perform pointing or attitude control maneuvers. A particular advantage of the presently described propulsion systems is that, by enabling such attitude control capability, satellite operators are able to use lower power momentum wheels and perform "momentum dump" maneuvers. Additionally, since motors are can be fired in pairs around the satellite center of gravity 640, the random, very small variations in motor impulse result in lower overall residual spacecraft momentum compared to prior art, liquid propulsion systems, once again resulting in less momentum wheel use and energy consumption.

Furthermore, use of as SEA bus as described above enables reduction of satellite power requirements and solar panel size. The lack of ancillary hardware of the instant propulsion systems as compared to liquid propellant systems, such as propellant and pressurant tanks, valves, plumbing, and fittings, greatly reduces the package volume of the propulsion systems. Additionally, due to the modular and flexible design of the instant propulsion systems, they are easily adaptable to fit in unused space within satellite structures including separation rings, mounting areas for star trackers, seekers, solar arrays, etc. Further still, the construction of propulsion systems in accordance with the instant disclosure result in a very favorable shipping classification and the "bolt on" nature of a solid propulsion system is possible, thereby greatly reducing life cycle costs due to ease of handling, workflow simplification and design simplicity.

While particular preferred embodiments have been shown and described, those skilled in the art will appreciate that changes and modifications may be made without departing from the instant teachings. It is therefore contemplated that any and all modifications, variations or equivalents of the above-described teachings fall within the scope of the basic underlying principles disclosed above and claimed herein.

What is claimed is:

1. A propulsion system for a satellite, comprising:
   a substrate;
   a communication network;
   a cluster of individually selectable solid fuel motors mounted on the substrate and A operatively connected to the communication network, each of the solid fuel motors comprising a metal housing encasing a solid propellant; and
   a controller operatively connected to the communication network and operative to select any one or more motors of the individually selectable solid fuel motors and transmit signals to fire the one or more motors of the individually selectable solid fuel motors.

2. The propulsion system of claim 1, wherein the substrate is planar.

3. The propulsion system of claim 1, wherein the substrate has a substantially circular perimeter.

4. The propulsion system of claim 1, wherein the substrate has a substantially rectangular perimeter.

5. The propulsion system of claim 4, wherein the substrate is configured for mounting in a CubeSat module.

6. The propulsion system of claim 1, wherein the cluster of individually selectable solid fuel motors comprise between 10 and 1000 motors.

7. The propulsion system of claim 1, wherein the motors in the cluster of individually selectable solid fuel motors are arranged in an array.

8. The propulsion system of claim 1, wherein the cluster of individually selectable solid fuel motors comprises subsets of motors, the motors of each subset having an impulse capability different than the motors of each other subset of motors.

9. The propulsion system of claim 1, wherein each motor of the cluster of individually selectable solid fuel motors comprises a green propellant.

10. The propulsion system of claim 1, wherein the controller comprises:
    a network controller; and
    a plurality of integrated circuits operatively connected to the network controller via the communication network, wherein each integrated circuit of the plurality of integrated circuits corresponds to at least one motor of the cluster of individually selectable solid fuel motors.

11. The propulsion system of claim 10, wherein each integrated circuit has a unique identifier stored therein, thereby facilitating selection of each motor of the cluster of individually selectable solid fuel motors.

12. The propulsion system of claim 10, wherein each integrated circuit is configured to actuate at least one igniter associated with the at least one motor of the cluster of individually selectable solid fuel motors.

13. A satellite comprising at least one propulsion system of claim 1.

14. The satellite of claim 13, further comprising:
    a pair of propulsion systems of the at least one propulsion system arranged at complementary positions about a center of gravity of the satellite.

* * * * *